(12) United States Patent
Eitan et al.

(10) Patent No.: US 6,572,920 B1
(45) Date of Patent: Jun. 3, 2003

(54) METHOD OF COATING GRANULATED MATERIAL

(75) Inventors: Nimrod Eitan, Tel Aviv (IL); Asher Golan, deceased, late of Zichron Yaakov (IL), by Riva Golan, executor; Yechiel Gilo, Meron Hagalil (IL)

(73) Assignee: Cycle Group Limited of Delaware, Mocksville, NC (US)

( * ) Notice: Subject to any disclaimer, the term of this patent is extended or adjusted under 35 U.S.C. 154(b) by 0 days.

(21) Appl. No.: 09/497,337

(22) Filed: Feb. 3, 2000

(51) Int. Cl.$^7$ .............................. B05D 3/12; B05D 1/40; B05D 1/36

(52) U.S. Cl. ...................... 427/214; 427/212; 427/240; 427/242

(58) Field of Search ................................. 427/212, 214, 427/240, 242

(56) References Cited

U.S. PATENT DOCUMENTS

| | | | | |
|---|---|---|---|---|
| 3,640,787 A | | 2/1972 | Heller | 156/77 |
| 3,989,852 A | | 11/1976 | Palmer | 426/289 |
| 3,991,225 A | * | 11/1976 | Blouin | 427/215 |
| 4,023,955 A | * | 5/1977 | Mueller | 427/214 |
| 4,082,533 A | * | 4/1978 | Wittenbrook et al. | 71/28 |
| 4,427,719 A | * | 1/1984 | Moore | 427/205 |
| 4,548,507 A | * | 10/1985 | Mathis et al. | 366/20 |
| 4,842,790 A | * | 6/1989 | Nunnelly | 264/117 |
| 5,215,041 A | * | 6/1993 | Krahenbuhl | 119/172 |
| 5,308,396 A | | 5/1994 | Kovacs | 106/677 |
| 5,650,184 A | | 7/1997 | Humphry et al. | |
| 5,735,232 A | * | 4/1998 | Lang et al. | 119/171 |
| 5,935,626 A | | 8/1999 | Moechnig et al. | 426/74 |
| 6,174,768 B1 | * | 1/2000 | Ochi et al. | 119/172 |
| 6,030,565 A | * | 2/2000 | Golan | 264/117 |
| 6,203,803 B1 | * | 3/2001 | De La Charriere | 424/401 |
| 6,294,118 B1 | * | 9/2001 | Huber et al. | 264/118 |

FOREIGN PATENT DOCUMENTS

| | | | |
|---|---|---|---|
| EP | 0 744 212 A2 | 11/1996 | |
| EP | 0 897 745 A1 | 2/1999 | |
| SU | 979223 | * 12/1982 | 427/2.18 |
| WO | 97/27264 | 7/1997 | |

OTHER PUBLICATIONS

English Abstact of SU 979223 (Dec. 1982).*
Patent Abstracts of Japan, JP 58189336, Nov. 5, 1983.

* cited by examiner

Primary Examiner—Shrive P. Beck
Assistant Examiner—Michael Cleveland
(74) Attorney, Agent, or Firm—Birch, Stewart, Kolasch & Birch, LLP

(57) ABSTRACT

A process for multi-layer coating of bulk granulated materiel, the process comprising the steps of obtaining a bulk of granulated materiel at a damp state, premixing the granulated materiel with a first coating agent provided at powdered form and then introducing the premixed material into an inlet-end of a spiral winding path within a rotating drum. The dim is rotated at a speed so as to advance the material along the winding path towards an outlet-end thereof, whilst at least a second coating agent is introduced into the drum. Finally, the coated material is dried.

12 Claims, 3 Drawing Sheets

METHOD OF COATING GRANULATED MATERIAL

FIELD OF THE INVENTION

The present invention is in the field of coating processes and in particular it is directed to a process for coating granulated material obtained in a damp state.

BACKGROUND OF THE INVENTION

A variety of coating methods and processes are known for coating of granulated or particulated material. Typically, such coating methods are intended for encapsulating the granulated material in order to improve its resistance to humidity and to oxygen, so as to maintain the properties of the material.

Accordingly, the nature of such coatings is that they are liquid repelling and impervious to gasses.

Typically, coatings of this nature are applied by precoating the granulated material with an adhesive agent and then applying the coating substances. In other cases, a liquid solution is applied over the granulated material and is then allowed to dry.

Methods of coating are disclosed, for example, in the following U.S. Pat. Nos. 3,640,787, 3,989,852, 5,308,396 and 5,935,626.

It is noted, however, that in accordance with the present invention the coating material is required to be liquid-permeable so as to allow absorption of liquid by the granulated material.

SUMMARY OF THE INVENTION

According to a first aspect of the present invention there is provided a process for multi-layer coating of bulk granulated material, the process comprising the following steps:

(a) obtaining a bulk of granulated material in a damp state;

(b) premixing the granulated material with a first coating agent provided in powdered form;

(c) introducing the premixed material of step (b) into an inlet-end of a spiral winding path within a rotating drum;

(d) rotating the drum at a speed so as to advance the material along the winding path towards an outlet-end thereof;

(e) introducing at least a second coating agent into the drum; and (f) drying the coated material.

In order to obtain best results, the second agent is applied over the material from above in either powdered form or as a fine spray. However, in a preferred embodiment, no liquids are added during the coating process.

According to a preferred embodiment of the present invention, the premixed material of step (b) is introduced into the drum at a continuous rate while the drum rotates at a fixed speed.

By a specific design, the winding path is defined by spiral walls radially extending from a wall of the drum, which walls are preferably coated with a material preventing adherence of the coated material.

Typically, step (b) is carried out by a screw-type mixing conveyor also referred to as "ribbon-screw" or "ribbon-auger" conveyor.

An important character of the invention is that essentially no liquid is added during the coating process wherein the liquid required for adhering the powdered material is extracted from the granulated material.

Preferably, the bulk granulated material is an agglomerated material having a substantially high absorbing capacity. However, the invention is not restricted to agglomerated material.

According to a second aspect of the present invention there is provided a dryer suitable for use in a process according to the present invention, the dryer comprising a housing, and a woven-wire conveyor belt extending within the housing between a loading end and an unloading end of the conveyor belt. The conveyor belt passes through a zone of air at ambient temperature adjacent the loading end; a zone of warm air (about 50–70° C.) downstream of said ambient air zone and a hot air zone (about 100–150° C.) adjacent the unloading end of the conveyor belt; and a pneumatic disperser for dispersing the granulated material above at least a portion of the conveyor belt.

In one specific and preferred embodiment, intermediate the unloading end and the hot air blower, the conveyor belt extends through a second zone with air at ambient temperature. Preferably, there is provided at least one blower for propelling air through the different zones and through a heat exchanging device. The heat exchanging device is preferably a burner.

In another preferred embodiment, curtain walls are provided between corresponding zones of ambient temperature and the warm and hot zones, respectively, for separating zones at ambient temperature from heated zones.

There is also provided a method for using a dryer of the above-mentioned type wherein the method comprises the following steps:

(a) Loading the granulated material on a metal woven conveyor belt;

(b) Exposing the granulated material to air at ambient temperature;

(c) Exposing the granulated material to warm air;

(d) Exposing the granulated material to hot air;

(e) Unloading the granulated material from the conveyor belt.

Typically, prior to step (e) the granulated material is exposed to air at ambient temperature.

At least during step (c) the granulated material is dispersed above the conveyor.

BRIEF DESCRIPTION OF THE DRAWINGS

In order to better understand the invention and to see how it may be carried our in practice, preferred embodiments will now be described, by way of non-limiting examples only, with reference to the accompanying drawings, in which.

DETAILED DESCRIPTION OF SPECIFIC EMBODIMENTS

Figure 1:
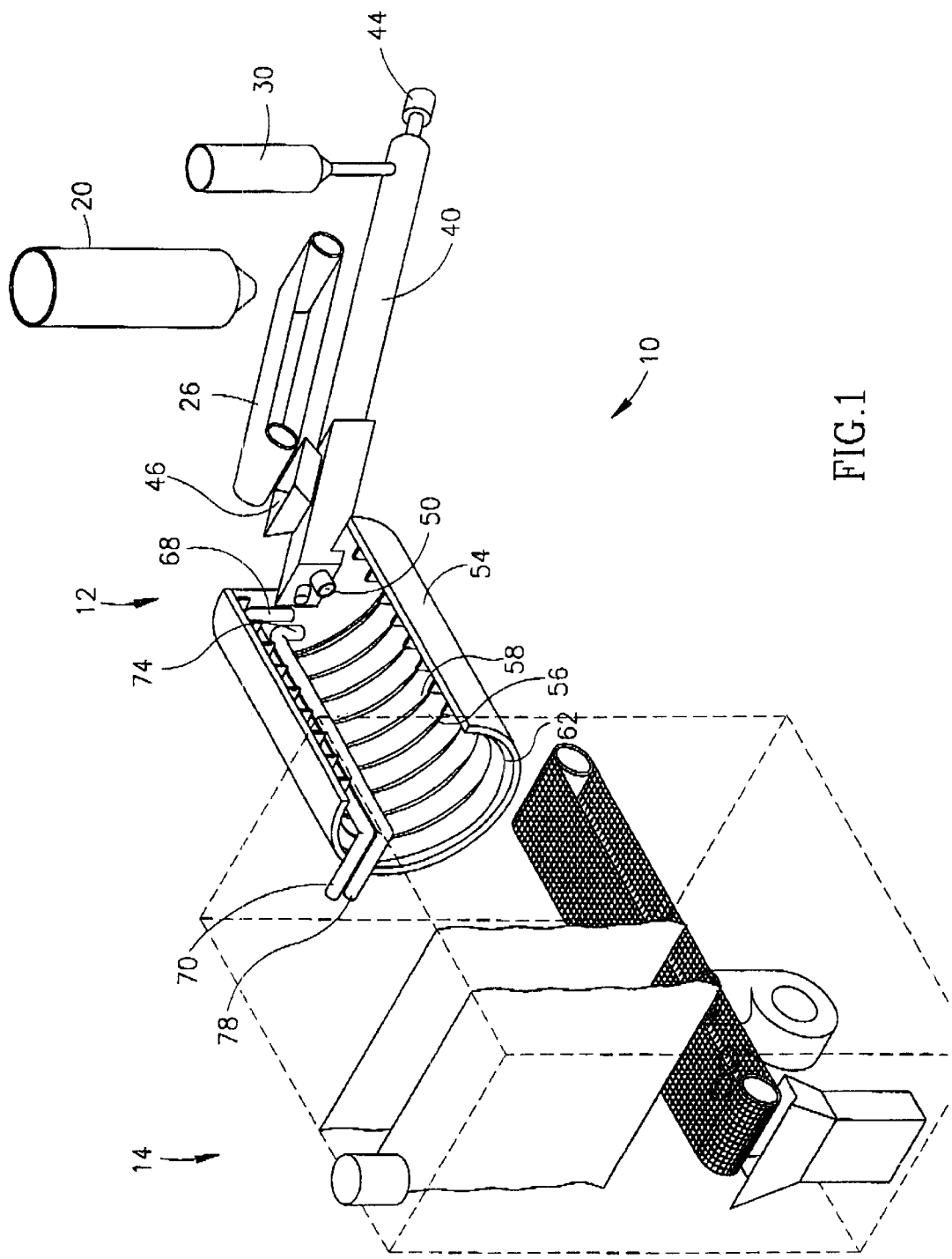
FIG. 1 is a schematic, perspective, partially sectioned view of a combined coating and drying process in accordance with the present invention.
Figure 2:
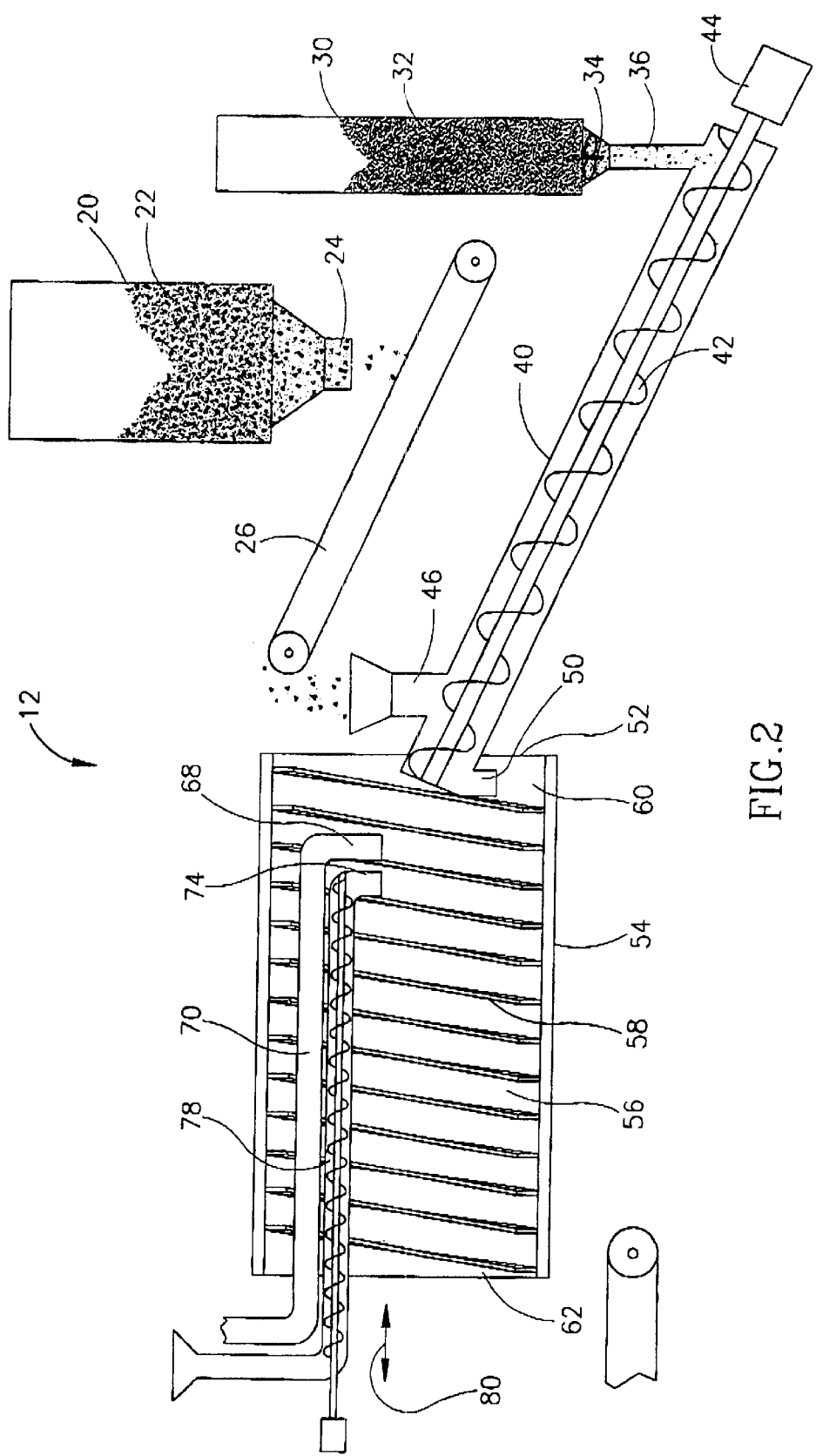
FIG. 2 is a schematic sectional view of only the coating section of the present invention.
Figure 3:
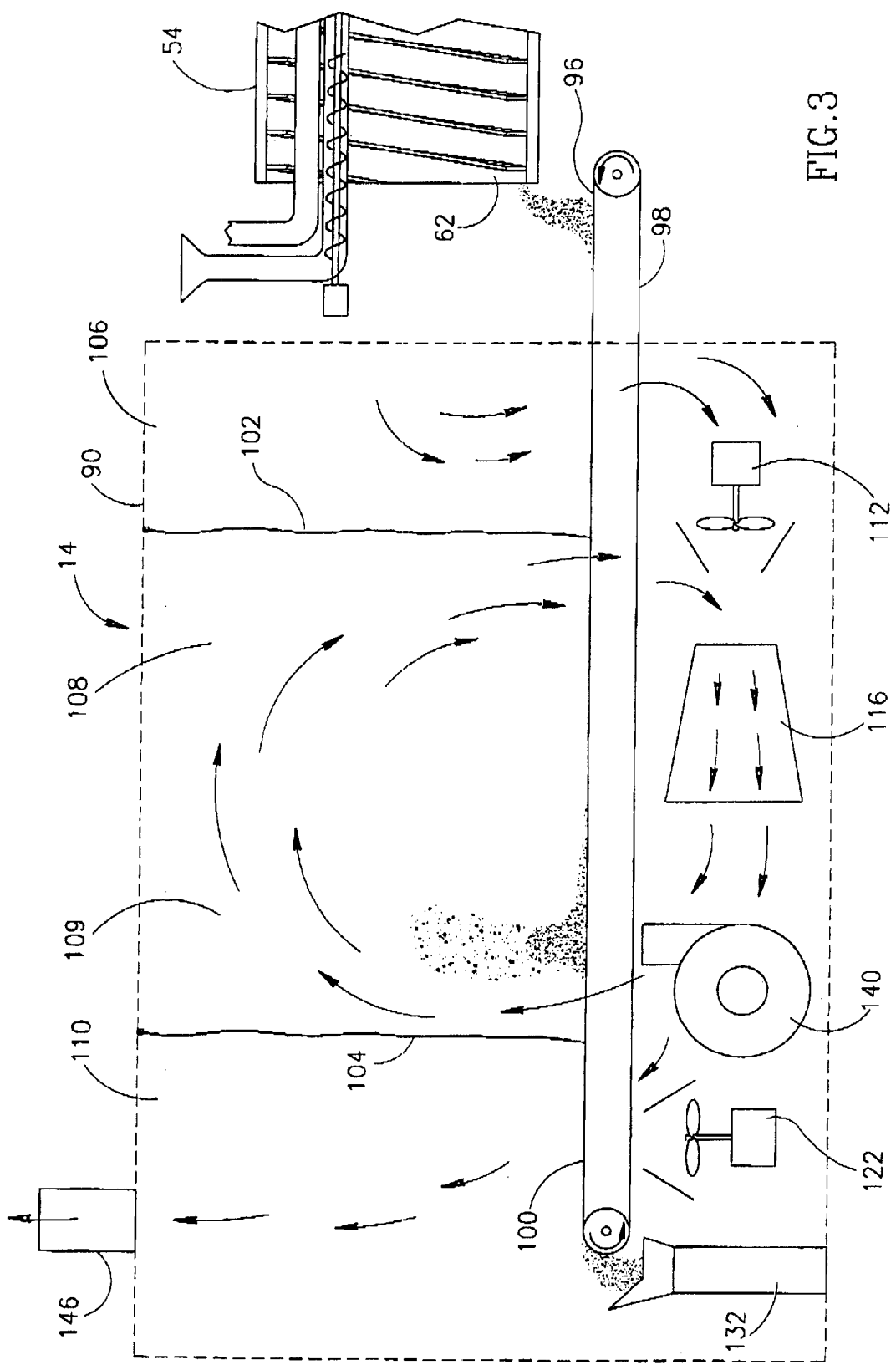
FIG. 3 is a schematic side view of a dryer for use in drying of coated material in accordance with the present invention.

Attention is first directed to FIG. 1 of the drawings in which a coating and drying facility generally designated 10 is schematically illustrated consisting of a coating apparatus generally designated 12 and a drying apparatus generally designated 14, each of which can be seen in more detail in FIGS. 2 and 3, respectively.

With further reference also to FIG. 2, the coating apparatus 12 comprises a first supply of bulk granulated material 22 which is, by a preferred embodiment of the invention, an agglomerated fibrous material which is freshly received from an agglomeration process and is at a damp state such as a moisture content of about 40 percent. In the present embodiment the agglomerated material is received from silo 20 which is fitted with a suitable control gate at 24, typically being pneumatically controlled, for controlling the timing and amount of granulated material falling onto belt conveyor 26 transversally extending below. However, the granulated material may be received directly from a manufacturing process.

A second silo 30 holds a first coating agent 32, which is typically a powdered material such as bentonite. Silo 30 is fitted with a control gate at 34 (typically being, a metering screw) extending via a tube portion 36 into a first end of a screw-type mixing conveyor 40 comprising a screw 42 rotatable by electric motor 44. The conveyor 40 has adjacent a second end thereof an opening 46 below an end of belt conveyor 26 for receiving the granulated material 22 and premixing it with the first coating agent 32. The first coating agent typically has properties of high absorbency, odor encapsulating etc.

The premixed material is then fed through outlet 50 into a receiving end 52 of coating drum 54, the latter being rotatable about its longitudinal axis and comprises a winding path 56 established by winding walls 58, extending essentially radially, whereby granulated material fed into the beginning of the thread at 60, is propelled along the winding path until it is received at the opposite end 62 of drum 54.

The walls of the path 56 are coated with a material such as Teflon® for preventing adherence of the damp material onto the walls of the path.

A second coating agent is applied over the agglomerated material through nozzle 68 extending at the end of a first conveyor 70 and a third coating agent is applied over the coating material through outlet 74 at an end of a second, screw-type dispenser 78. The second and third (as well as any other coating layers) may be applied on the material in a powdered form or as a fine spray, the former being preferred so as to refrain from adding liquids during the process. It is appreciated that the adherence of the coating layers over the agglomerated material is obtained by the humidity of the agglomerated material obtained during the agglomeration process, which humidity is expelled by a capillary effect.

The conveyors 70 and 78 may be independently displaceable in the axial direction represented by arrow 80 whereby the coating parameters and order of coatings may be differed.

It was found that in order to obtain best results, the premixed material obtained at outlet 50 of the conveyor 40 should be introduced into the drum 54 at a continuous and essentially constant rate wherein the drum 54 rotates at a constant speed as well, thereby avoiding lumping and dumping of material and adherence to the walls of the spiral path.

It is to be understood that the coating agents may be any of different materials depending on the desired qualities of the coated material such as de-dusting agents, absorbents, odor treating agents, color agents, minerals, disinfectants, etc.

The coated material received at end 62 of drum 54 is then transferred to the drying facility 14 which is best seen in FIG. 3. The drying facility 14 comprises a generally closed housing 90 with a loading end 96 of a conveyor belt 98 projecting from the housing 90. The conveyor belt extends through the housing and has an unloading end 100.

Conveyor belt 98 is typically made of woven metal and has openings sufficient to allow passage of air currents therethough whilst retaining the material received from the drum 54.

The interior of the dryer 14 is divided by two downwardly suspended curtains 102 and 104 defining a first cool zone 106, a warm zone 108, a hot zone 109 and a second cool zone 110. The term "cool zone" as used herein denotes a non-heated zone which is essentially at ambient temperature.

Below the conveyor 98 there is a blower 112 positioned such that it draws ambient air through an opening in housing 90, which ambient air passes through the respective portion of conveyor belt 98 and is then fed into burner 116 whereby the air is heated to a temperature of about 100–150° C. The air then flows through the mashed conveyor belt 98 as illustrated by the arrowed lines whereby it strikes the coated material whilst it is still hot at the zone identified at 109. The air then continues to flow in the warm zone 108 of the chamber and then strikes the coated material at a substantially lower temperature of about 50–70° C. Then the air again passes through the conveyor belt where at least some of it is reheated by burner 116.

Some of the air then departs into the second cool zone 110. In one specific embodiment there is provided a second blower 122. However, this blower may be omitted at some circumstances. An additional blower may be introduced in the first cool chamber 106, for propelling the ambient air temperature through the conveyor belt (not shown). For this purpose, an opening may be formed adjacent the blower 122 (not shown).

The dried material is then discharged from the unloading end 100 of the conveyor belt 98 into a collecting member 132 and the material is then transferred for packaging.

In order to improve the drying, there is provided at least one pneumatic disperser 140 for dispersing the granulated material above the conveyor whereby it is dried in a more homogeneous way.

Housing 90 is fitted with a chimney 146 for removing excessive heat and fumes.

Whilst preferred embodiments have been shown and described, it is to be understood that it is not intended thereby to limit the disclosure of the invention, but rather it is intended to cover all modifications and arrangements falling within the spirit and the scope of the invention, mutatis mutandis.

What is claimed is:

1. A process for multi-layer coating of bulk granulated material to produce a liquid absorbing product, the process comprising the following steps:
   (a) obtaining a bulk of agglomerated liquid-absorbing fibrous granulated material in a damp state having a moisture content sufficient to supply liquid for adhering a coating agent in powdered form to the material;
   (b) premixing the damp, fibrous, agglomerated granulated material with a first liquid-permeable coating agent provided in powdered form, wherein substantially all of the liquid for adhering the first liquid-permeable coating agent to the granulated material is extracted from the granulated material;
   (c) introducing the premixed granulated material and first liquid-permeable coating agent into an inlet-end of a spiral winding path within a rotating drum;

(d) rotating the drum at a speed so as to advance the material along the winding path towards an outlet-end thereof; and then (e) introducing a second liquid-permeable coating agent into the drum to adhere the second coating agent; and (f) drying the coated material.

2. The coating process according to claim 1, wherein the second agent is applied onto the material from above.

3. The coating process according to claim 2, wherein the second agent is applied on the material in a powdered form.

4. The coating process according to claim 1, wherein the second agent is introduced from an outlet nozzle displaceable within the drum along its longitudinal axis.

5. The coating process according to claim 1, wherein the premixed material of step (b) is introduced into the drum at a continuous rate and wherein the drum rotates at a fixed speed.

6. The coating process according to claim 1, wherein the winding path is defined by spiral walls radially extending from a wall of the drum.

7. The coating process according to claim 6, wherein the walls of the winding path are coated with a substance preventing adherence of the granulated material.

8. The coating process according to claim 1, wherein step (b) is carried out by a screw-type mixing conveyor.

9. The coating process according to claim 1, wherein the first coating agent is an encapsulating agent.

10. The coating process according to claim 1, wherein the first coating agent is bentonite.

11. The coating process according to claim 1, wherein the second coating agent is selected from a group consisting of de-dusting agents, absorbents, odor treating agents, color agents, minerals, and disinfectants.

12. A process for multi-layer coating of bulk granulated material to produce a liquid absorbing product, the process comprising the following steps:

(a) obtaining a bulk of agglomerated liquid-absorbing fibrous granulated material in a damp state having a moisture content sufficient to supply liquid for adhering a coating agent in powdered form to the material;

(b) premixing the damp, fibrous, agglomerated granulated material with a first liquid-permeable bentonite coating agent provided in powdered form, wherein substantially all of the liquid for adhering the bentonite coating agent to the granulated material is extracted from the granulated material;

(c) introducing the premixed granulated material and bentonite coating agent into an inlet-end of a spiral winding path within a rotating drum;

(d) rotating the drum at a speed so as to advance the material along the winding path towards an outlet-end thereof; and then (e) introducing a second liquid-permeable coating agent, selected from the group consisting of de-dusting agents, absorbents, odor treating agents, color agents, minerals, and disinfectants, into the drum; to adhere the second coating agent and (f) drying the coated material.

* * * * *